July 22, 1969

R. F. SOUTH 3,456,499

ENGINE ANALYZER

Filed June 28, 1966

INVENTOR
Robert F. South

BY
ATTORNEY

July 22, 1969   R. F. SOUTH   3,456,499
ENGINE ANALYZER
Filed June 28, 1966   3 Sheets-Sheet 2

INVENTOR
Robert F. South
BY
ATTORNEY

INVENTOR
Robert F. South

United States Patent Office

3,456,499
Patented July 22, 1969

---

3,456,499
ENGINE ANALYZER
Robert F. South, Dallas, Tex., assignor to
Beta Corporation, a corporation of Texas
Filed June 28, 1966, Ser. No. 561,140
Int. Cl. G01m 15/00
U.S. Cl. 73—117.2        22 Claims

ABSTRACT OF THE DISCLOSURE

An engine analyzer for analyzing the performance of multi-cylinder internal combustion engines in which a count is set in a counter which is a function of the engine crankshaft position when a master cylinder is at the top dead center position. A series of electrical pulses are applied to the counter each cycle of the engine such that an output pulse is generated responsive to the count in the counter indicating that a cylinder under consideration is at a selected position. The output pulse is applied as a synchronizing pulse to an oscilloscope on which a characteristic curve of the engine is to be displayed.

---

Engine analyzers comprise, in general, sensing elements or transducers associated with one or more cylinders of the engine and which are adapted to give indications in the form of electrical pulses or waves of the various characteristics of the engine. Curves traced by utilizing the indications furnished from such transducers can provide information regarding the performance of the engine and can be utilized for determining actual or imminent malfunction of the engine. Exemplary of the various characteristics of the engine that may be so displayed are the pressure within a cylinder, vibration and ignition information.

As indicated above, the information provided by the various transducers is most often displayed in curve form and, accordingly, the outputs of the transducers are commonly connected to a suitable curve tracing mechanism such as a cathode ray tube. However, for the curve traced by the cathode ray oscilloscope to be meaningful, the curve displayed must be related in time to the occurrence of a known event, suitably the point in time that the piston of the cylinder under study is at the top dead center position. Thus, it is desirable or preferred that the curve begin at the time the piston is at the top dead center position, and it is also desirable that there be some means provided for correlating the position of the piston within the cylinder with various points on the curve being traced.

The present invention provides an improved method and apparatus for the testing of internal combustion engines which satisfy the above needs. Thus, by utilizing the principles of the present invention, it is possible to initiate each curve displaying the desired information at a time closely related to the top dead center postion of the piston of the cylinder under consideration and also to indicate upon the curve desired positions of the piston as related to the number of degrees of the piston past the top dead center position.

In accordance with the present invention, there is provided counter means and means for setting a count in said counter each cycle of the engine being tested. There is also provided means responsive to the count in the counter for producing an output pulse and means for advancing the count in the counter at a rate which is a function of the speed of the engine whereby output pulses are produced in synchronizm with the cycles of the engine. Preferably, the count in the counter at which an output pulse is produced in an integral factor of 360°, such as 360 or 720, to facilitate the correlation of the count in the counter with the position of the engine crank shaft and/or the position of the piston in the cylinder under consideration. The output pulse produced by the means responsive to the count in the counter can then be applied to a synchronizing input of an oscilloscope or other suitable curve tracing device for the purpose of initiating a sweep of a curve. There is also provided additional means responsive to a count in the counter for providing additional output pulses at desired positions for the piston associated with the cylinder under test. By applying such additional pulses to the vertical input of an oscilloscope, pips or markers will be formed on the trace indicating particular cylinder piston positions for the purpose of correlating the information displayed on the oscilloscope with the cylinder piston position.

In accordance with the preferred embodiment of the invention, the apparatus can be utilized with either a two or four cycle engine. A transducer, suitably a magnetic pickup, is suitably associated with the crank shaft of the engine for producing an output pulse each revolution of the crank shaft. This output pulse is suitably produecd at the position of the crank shaft when the master cylinder of the engine is at its top dead center position. There is also provided a first group of switches connected to the counter such that when a pulse is applied through the switches to the counter, a count dependent upon the setting of the switches will be set into the counter. If the apparatus is utilized with a two cycle engine wherein each rotation of the crank shaft results in a complete cycle of the engine, a signal caused by the first transducer is connected through the switches to the counter for purposes of setting a desired count therein. If, on the other hand, the apparatus is used with a four cycle engine in which the crank shaft rotates 720° for each cycle of the engine, the output of the transducer is applied to the switches through suitable circuitry such that one pulse will be applied to the switches for each two pulses from the first transducer.

There is also provided a second transducer for producing a series of pulses at a frequency related to the speed of the engine. Preferably, the second transducer produces 360 pulses each revolution of the crank shaft or one pulse each degree of rotation of the crank shaft. The output of the second transducer is applied to the counter for advancing the count therein. There is also provided a diode gate for producing an output responsive to the count in the counter attaining a desired level. In accordance with the preferred embodiment of the invention, the diode gate is capable of producing an output when the count stored in the counter is either 360, in the case of a two cycle engine, or 720, in the case of a four cycle engine. The output of the counter through the diode gate is applied to a horizontal synchronizing input of an oscilloscope and also to reset inputs of the counter to reset the counter.

It can therefore be seen that if the count in the first group of switches is set to 000, that an output will be produced from the AND gate at the top dead center position of the master cylinder. By setting the first group of switches to represent a number equal to the number of degrees that the top dead center position of any cylinder under consideration lags the top dead center position of the master cylinder, a count will be set into the counter equal to that number of degrees upon an output being applied to the input of the first of switches from the first transducer. Thereafter, output pulses will be obtained from the diode gate each time the cylinder under consideration is at its top dead center position.

It will also be appreciated that the count in the counter always be indicative of the position of the piston in the cylinder under question. Thus, if the count in the counter was 50 and a two cycle engine was being analyzed, it would indicate that the piston in the cylinder under consideration was 50° past the top dead center position. There is also provided a second group of switches connected to the output of the counter such that when the count in the counter becomes equal to the count indicated by the setting of the switches, a second output pulse will be obtained. By applying this second output pulse as a vertical input to the oscilloscope, a pip or marker will be provided on the trace indicating that at that time the piston was the number of degrees past the top dead center position indicated by the switches. Alternatively, by connecting the second output to the Z axis of the scope, either a blanking or intensification of the oscilloscope trace will be provided.

Many objects and advantages of the invention will become readily apparent to those skilled in the art as the following detailed description of a preferred embodiment of the same unfolds when taken in conjunction with the appended drawings wherein like reference numerals denotes like parts and in which.

Figure 3:
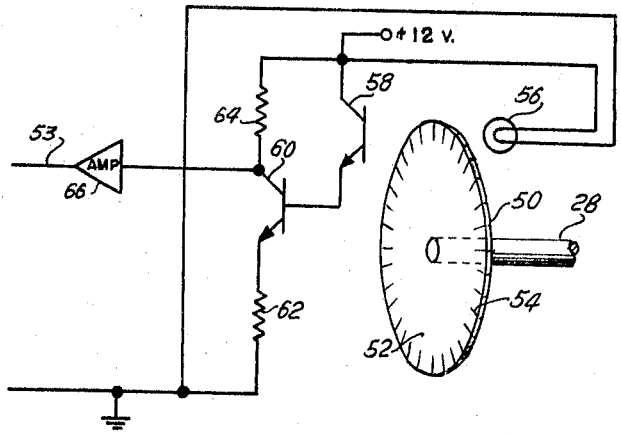
Figure 5:
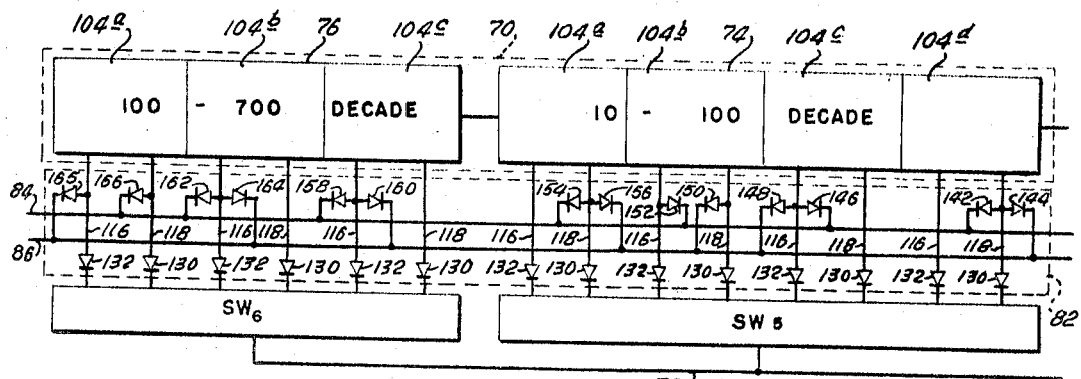
Figure 6:
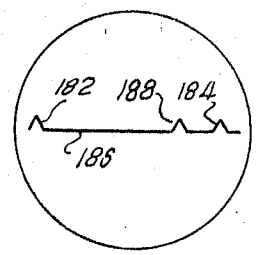
Figure 4:
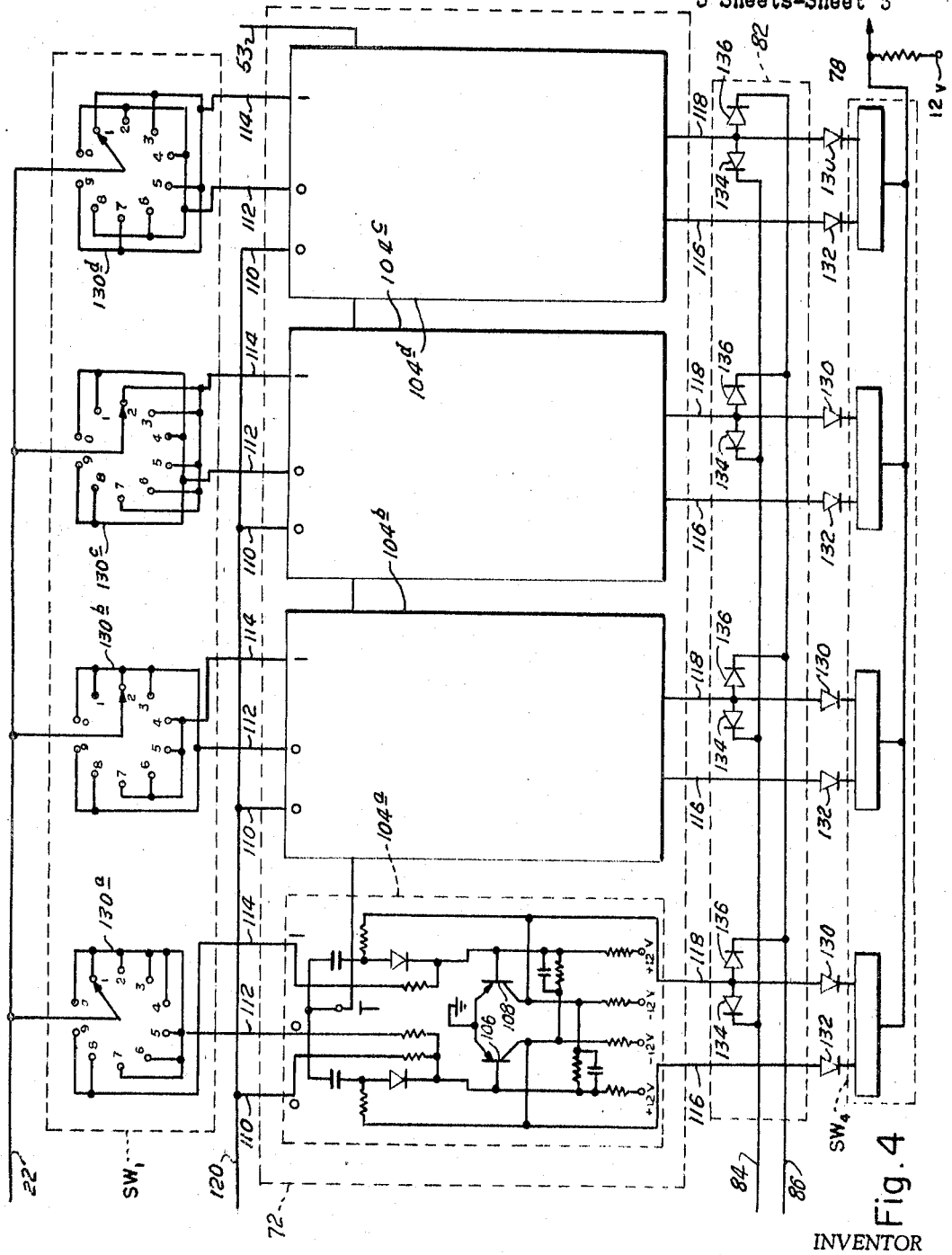

FIGURE 3 schematically illustrates a second transducer utilized in the preferred embodiment of the present invention;

FIGURE 4 is a view schematically illustrating the connections between one decade of a counter and switches utilized in conjunction with the counter in accordance with the preferred embodiment of the invention;

FIGURE 5 is a schematic diagram of a diode gate utilized in the preferred embodiment of the present invention; and FIGURE 6 shows the use of the trace of the oscilloscope to adjust the frequency of an oscillator used in the practice of an embodiment of the invention.

Figure 1:
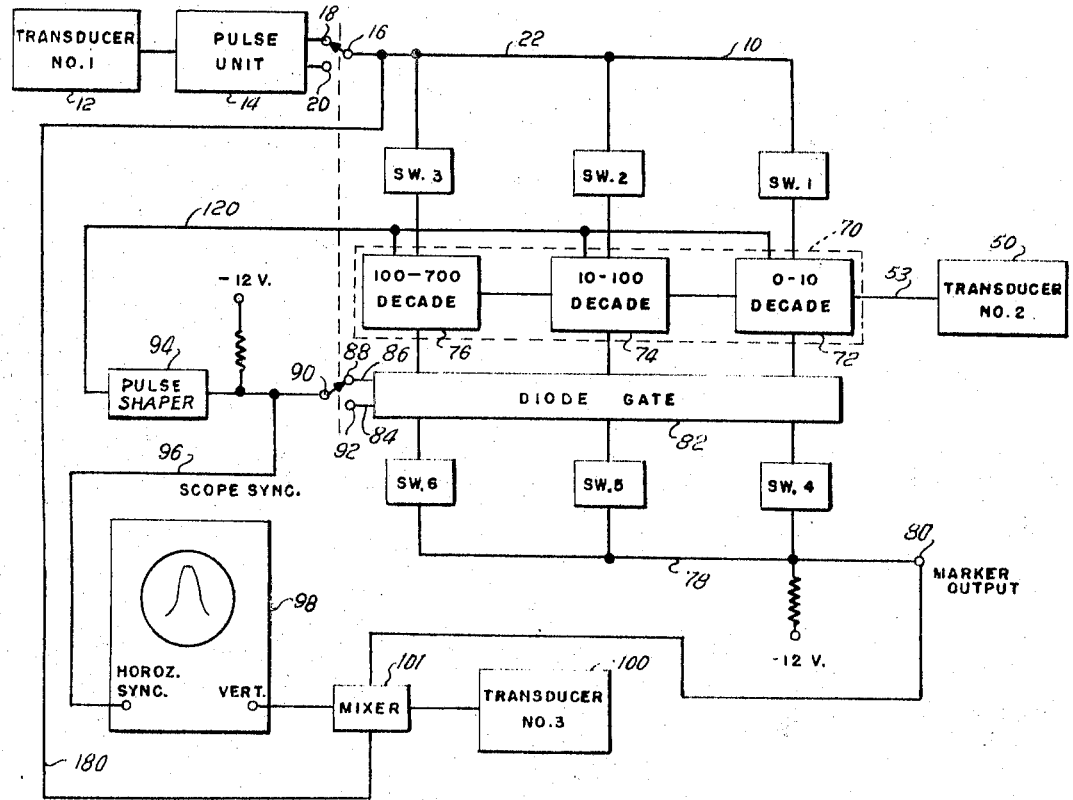
FIGURE 1 is a block diagram illustrating the preferred embodiment of the present invention.

Turning now to FIGURE 1 of the drawings, an exemplary referred apparatus of the present invention is desingated generally by the reference character 10. It can be seen to comprise a first transducer 12 whose output is connected to a pulse unit 14. There is also provided a switch 16 having two contacts 18 and 20, each of which is connected to the output of the pulse unit 14. The armature of the switch 16 is connected to an input line 22. This switch is gauged for operation with another switch 90 to be described later.

Figure 2:
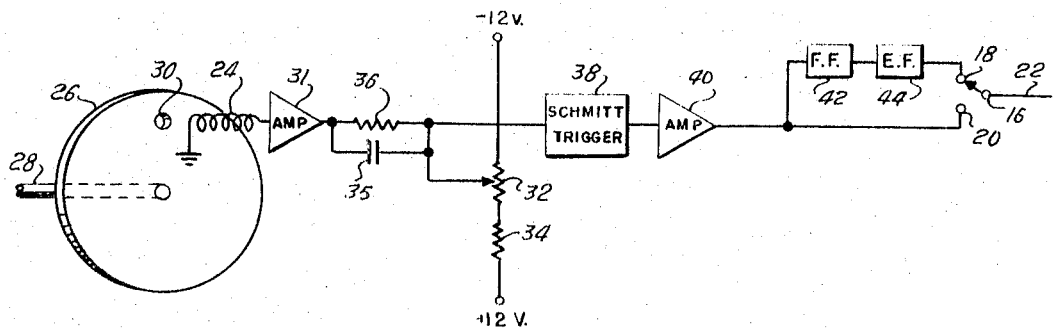
FIGURE 2 is a diagram partially schematic and partially in block diagram form illustrating in detail an exemplary transducer and pulse unit employed in the preferred embodiment of the invention.

The transducer 12 and pulse unit 14 are suitably shown in FIGURE 2 of the drawings. Thus, in accordance with the preferred embodiment of the invention, the transducer 12 is a magnetic pickup which suitably comprises a magnetic coil 24 positioned adjacent a fly wheel 26 attached to crank shaft 28 of an engine to be analyzed. A hole 30 is formed in the fly wheel 26. Thus, each time the hole 30 passes the magnetic coil 24, the coupling of the coil will change, resulting in a change in its impedance. Coil 24 is connected through an amplifier 31 to a level sensing network comprising variable resistor 32 and a fixed resistor 34 connected between two levels of different potential, suitably −12 volts and +12 volts, as shown. A tap on the variable resistor 32 is connected through capacitor 35 to the output of amplifier 31. Resistor 36 is connected in shunt with the capacitor 34. A tap 32 is also connected to the input of a Schmitt trigger circuit 38. The Schmitt trigger circuit 38 is of conventional type and includes two transistors (not shown). The tap on resistor 32 is connected to the base of one of the two transistors such that a proper change in potential at the base of the transistor will cause the Schmitt trigger circuit to operate. This change in potential is, of course, produced by a change in the impedance of the coil 24. The output of the Schmitt trigger circuit 38 is connected through an amplifier 40 to contact 20 of switch 16. The output of the amplifier 40 is also connected through a flip-flop circuit 42 and an emitter follower 44 to contact 18 of switch 16. When the armature of switch 16 contacts terminal 20, a pulse will be applied from the Schmitt trigger circuit 38 to line 22 each revolution of the fly wheel 26. On the other hand, if the armature of switch 16 is connected to contact 18, an output pulse will be applied to line 22 from flip-flop 42 each second revolution of the fly wheel 26. If the engine under test is a two cycle engine, the switch 16 will be positioned for contact with terminal 20 since the fly wheel 26 will make one revolution each cycle of the engine, and consequently one cycle of each cylinder. On the other hand, if the engine is a four cycle engine requiring two revolutions of the crank shaft 28 to complete one cycle of the engine, switch 16 will be positioned to contact terminal 18. It can be seen that when switch 16 is closed to contact 18 an electrical pulse will be applied to line 22 each cycle of the engine or every two rank shaft revolutions. In accordance with the preferred embodiment of the invention, the hole 30 is positioned on the fly wheel 26 such that a pulse will be applied to line 22 at the time that the master cylinder of the engine is at the top dead center position.

There is also provided a second transducer 50 whose output is applied to the first decade 72 of a counter 70 by way of a line 53. The preferred second transducer 50 is shown in greater detail in FIGURE 3 of the drawings and in the particular form shown comprises a disk 52 mounted to crank shaft 28. Disk 52 is provided with 360 slots 54 about its periphery each slot being thus one degree apart. There is also provided a lamp 56 and a photo transistor 58. The collector of transistor 58 is connected to a suitable supply voltage, suitably +12 volts, preferably also powering the lamp 56 although a separate supply can be provided for the latter. The emitter of photo transistor 58 is connected to the base of a transistor 60. The emitter of transistor 60 is connected through resistor 62 to ground and the collector of transistor 60 is connected through resistor 64 to the source of supply voltage and through amplifier 66 to line 53. In operation of the circuitry shown in FIGURE 3, each time the disk 52 moves one degree, light will pass through one of the slots 54 from the lamp 56 onto the photo transistor 58. Upon this occurrence, the transistor 58 will be rendered conductive. When transistor 58 is conductive, a signal will be applied to the base of transistor 60, causing the potential of its collector to become more negative. Upon this occurrence, a positive going pulse will be produced at the output of amplifier 66 and applied to line 53. Thus, it can be seen that for each degree of rotation of the crank shaft 28 a positive going pulse will be applied to line 53. It is to be noted that it is not necessary that the disk 52 be synchronized in any manner with the position of the aperture 30 on the fly wheel 26, although both will be rotating at the same speed, since the maximum error will be 1°.

There is also provided a counter 70 comprising three decades 72, 72 and 76. The decades 72 and 74 are suitably of conventional type comprising four flip-flops. The counter 76 is also suitably of conventional type but only requires three of the flip-flops since it is only necessary that the counter 76 be capable of storing a count from 100 to 700 whereas the counter 72 indicates a count of 0 to 10 and the counter 74 indicates a count of 10 to 100. It will be appreciated, however, that many other types of counters and decadic arrangements can be used in the practice of the invention. The previously described line 22 is connected to decade 72 by switch $SW_1$, to decade 74 by switch $SW_2$ and to decade 76 by switch $SW_3$. Similarly, decades 72, 74 and 76 are each respectively connected to an output line 78 through switches $SW_4$, $SW_5$ and $SW_6$. Line 78 connects to a marker output terminal 80 which may be connected to an oscilloscope 98 for purposes to be described.

The counter 70 is connected through diode gate 82 to lines 84 and 86. Line 84 is connected to terminal 92 of previously mentioned switch 90 and line 86 is connected to a terminal 88 of switch 90. The armature of switch 90 is connected to the input of a pulse shaper 94, which is suitably a one shot multivibrator having an output connected to counter 70 by way of a line 120, preferably through an amplifier (not shown), so as to reset the counter 70 to 000. There is also provided a line 96 which is suitably connected from the armature of switch 90 to the horizontal synchronizing input of an oscilloscope 98. A third transducer 100 which is responsive to a variable such as pressure, vibration, etc. to be displayed on the scope is connected to the vertical input of the scope, suitably through a mixer 101. Both the transducer 100 and the mixer 101 may be of many different and conventional types, depending upon the particular test in question.

Turning now to FIGURE 4 of the drawings, decade 72 of the counter 70 is shown in greater detail as well as the connections between switches $SW_1$ and $SW_4$ and the portion of the diode gate 82 associated with the decade 72. The decade 72 includes four flip-flop circuits 104a, 104b, 104c and 104d. Each of the flip-flops 104 comprises a pair of transistors 106 and 108 and are connected to maintain each other in mutually opposite states of conduction. Each of the flip-flops 104 includes three inputs 110, 112 and 114. Inputs 110 and 112 are connected to the base of transistor 106 and input 114 is connected to the base of transistor 108. Each of the flip-flops 104 also includes a pair of output leads 116 and 118. Lead 116 is connected to the collector of transistor 106 and lead 118 is connected to the collector of transistor 108. When transistor 108 is not conductive, a negative potential will be present on line 118. Similarly, when transistor 106 is not conducting, a negative potential will be present at line 116.

Each of the flip-flops 104 therefore provides a binary bit, the four binary bits forming a binary word denoting a decimal number. The presence of a negative voltage on line 118 denotes a binary bit "0" and the presence of a negative potential on line 116 denotes a binary "1" bit. A negative potential applied to an input 114 will cause transistor 108 to assume a conductive state, resulting in transistor 106 being rendered non-conductive, providing a binary "1" output. Similarly, a negative input voltage to line 110 or 112 will result in transistor 108 being rendered non-conductive with a negative potential being available on line 118 indicating a binary "0."

The various flip-flop circuits associated with each decade are interconnected in a manner not shown but well known in the art such that the states of the flip-flops will provide a binary output as indicated in Table I below and reset to "0" when the count exceeds "9."

TABLE I

| Count: | Binary word |
|---|---|
| 0 | 0 0 0 0 |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |

The output of the pulse shaper 94 is applied through line 120 to the inputs 110 of each multivibrator in the counter. It will therefore be apparent that an output from the pulse shaper will be effective to set the counter 70 to a count of 000 and that this will occur simultaneously with the application of a synchronizing signal to the oscilloscope 98. The pulse shaper 94 suitably comprises a conventional one shot multivibrator and amplifier which produces an output pulse of sufficient duration to insure resetting of the counter 70, but whose width is less than the period of the rate at which the count in the counter advances. This is desirable to insure that on the 360th pulse, or 720th pulse if set for 4 cycle operation, the counter will be reset before the next clock pulse from transducer 50.

Switch $SW_1$, in a similar fashion as switches $SW_2$ and $SW_3$, includes a number of wafers equal to the number of flip-flops in the decade associated with the switch. Thus, switch $SW_1$ includes four wafers 130a, 130b, 130c and 130d, each associated with one of the flip-flops 104a, 104b, 104c and 104d, respectively. The wipers of the four wafers are commonly connected together to line 22 and also mechanically connected such that movement of one wiper will result in a similar movement of the other wipers associated with the switch. Each of the wafers 130 also includes ten terminals to be contacted by the respective wiper. Terminals of each wafer are connected to the inputs 112 and 114 of the associated flip-flop to set a binary word in the decade corresponding to the digital number set into the switch, as indicated in Table I. Thus, if the switch is set for the digit 3, a negative pulse on line 22 will be applied through wafer 130a to input 112 of flip-flop 104a, causing the flip-flop 104a to produce an output indicative of a "0" bit. Similarly, flip-flop 104b would be set to produce a binary bit "0" and flip-flops 104c and 104d would be set to produce outputs representative of a binary bit "1." It can be seen by referring to Table I that the resulting binary word would be 0011, indicative of a digital 3. This example is illustrated by the wafer positions of FIGURE 4.

Each of the lines 116 and 118 is connected through diodes 132 and 130, respectively, to a wafer of switch $SW_4$. Switch $SW_4$ is connected similar to that described with reference to switch $SW_1$ whereby outputs will be applied from the flip-flop circuits 104 to line 78 through switch $SW_4$ in accordance with the position of switch $SW_4$ and the binary word provided by the states of the flip-flops comprising the decade 72. A detailed showing of the connections of switch $SW_4$ is not made. It can therefore be seen that if the switch $SW_4$ is set to a digital 3, that an output would be provided at terminal 80 at such time as the digital word provided by the decade 72 is 0011. If the digital word provided by the decade 72 is other than 0011, ground potential will be applied to line 78 through switch $SW_4$ and one of the multivibrators 104, preventing an output at terminal 80.

There is also shown in FIGURE 4 that portion of the diode gate 82 associated with the decade 72. Thus, it can be seen that each line 118 associated with one of the multivibrators 104 is connected to line 84 through a respective diode 134 and to line 86 through respective diode 136. Thus, when all four of the multivibrators 104 are in a state indicating a binary bit "0," a negative voltage will be applied to both lines 84 and 86 from the decade 72. However, if one of the multivibrators 104 provides an output indicative of a binary bit "1," lines 84 and 86 will be maintained at ground potential, preventing a negative going output pulse from appearing on lines 84 or 86. Thus, an output pulse can appear on lines 84 and 86 only when the binary word of decade 72 is a digital 0.

A portion of the diode gate 82 associated with decades 74 and 76 is shown in FIGURE 5 of the drawings. It will be appreciated in this connection that although the decade 74 will have four flip-flops connected identically to that of decade 72, decade 76 will only require three flip-flops since only three bits are required to form a binary word representing a digital 7 or a digit less than 7. Line 118 associated with flip-flop 104d of decade 74 is connected through diodes 142 and 144 to lines 84 and 86, respectively. Similarly, line 116 of flip-flop 104c of decade 74 is connected through diodes 146 and 148 to lines 84 and 86 respectively. Line 118 of flip-flop 104b of decade 74 is connected through diode 150 to line 86 and lead 116 of flip-flop 104b of decade 74 is connected through diode 152 to line 84. Line 118 of flip-flop 104a of decade 74 is connected through diodes 154 and 156, respectively, to lines 84 and 86. A pulse will therefore be applied to line 84 only when the digital word formed by the outputs of the decade 74 is a decimal 6 and an output will be applied to line 86 from decade 74 only when the digital word forms a decimal 2.

Similarly, decade 76 includes three flip-flops 204a, b and c, each having outputs connected to lines 116 and 118. Line 116 associated with flip-flop 204c of decade 76 is connected through diodes 158 and 160 to lines 84 and 86, respectively. Further, line 116 of flip-flop 204b of decade 76 is connected through diodes 162 and 164 to lines 84 and 86, respectively. Similarly, line 118 of flip-flop 204a of decade 76 is connected through diode 166 to line 84 and line 116 is connected through diode 168 to line 86. It can therefore be seen that an output will be applied to line 84 from decade 76 only when the digital word is a decimal 3 and an output will be applied to line 86 when the digital word is a decimal 7. Thus, an output will be applied to the pulse shaper 94 if switch 90 is connected to terminal 88 when the counter 70 indicates a count of 720. Similarly, when the switch 90 is in a position to close to terminal 92, an output will be applied to the pulse shaper 94 from counter 70 when the total count stored in the counter is 360.

The count in the counter is, of course, a function of the initial count which may be set in the counter and the number of pulses applied to the input of the first decade 72 from transducer 50. Thus, if switches $SW_1$, $SW_2$ and $SW_3$ are each set to 0, at the top dead center position of the master cylinder an output will be applied from the transducer 12 and pulse unit 14 to set the counter 70 to 000. If a two cycle engine is under test, the switch 90 would be set to close to contact 92 and switch 16 would be set to close to contact 20. After one revolution of the code disk 52, 360 pulses would have been applied to counter 70 and the counter would apply an output to pulse shaper 94 and to the synchronizing input of the oscilloscope 98. Upon this occurrence, the pulse shaper would apply a signal to reset the counter to 000 and the scope would start displaying the desired information from a beginning at the top dead center position of the master cylinder. Since the maximum variation between the beginning of the scope trace and the top dead center position of the master cylinder would be less than 1° (due to the fact that the code disk 52 is continuously applying pulses to the counter and must be less than 1° off of the top dead center position), good correlation is obtained between the scope trace and the actual conditions within the cylinder.

If it is desired to examine the characteristics associated with a cylinder other than the master cylinder, a count is set in switches $SW_1$, $SW_2$ and $SW_3$ equal to the number of degrees that the cylinder under consideration lags the master cylinder. For example, 78° could be set into the counters $SW_1$, $SW_2$ and $SW_3$ if the top dead center position of the cylinder under test lags the top dead center position of the master cylinder by 78°. At such time as the aperture 30 in the flywheel 26 passes by the coil 24 of the magnetic pickup, a pulse would be applied through switches $SW_1$, $SW_2$ and $SW_3$ to set a count of 78 into the counter. After the disk 52 had rotated 282°, a count of 360 would be stored in the counter and an output would be applied to the scope sync to cause initiation of the scope sweep. It is to be noted that this would correspond with the top dead center position of the cylinder under test. Simultaneously, the pulse shaper 94 would apply a pulse through line 120 to reset the counter to 0. As the engine crank shaft continues to turn, the disk 52 would continue to be rotated and pulses would be applied to the counter. At the time that a signal is obtained from the first transducer, a count of 78 would be stored in the counter due to the pulses applied from transducer 50. Accordingly, the pulse applied from transducer 12 through switches $SW_1$, $SW_2$ and $SW_3$ would not affect the state of the counter, if no error had been made in counting or generation of pulses. Any error would, of course, be corrected by the pulse from the transducer 12. It can therefore be seen that by setting the switches $SW_1$, $SW_2$ and $SW_3$ to a decimal number equal to the number of degrees by which the cylinder under consideration lags behind the master cylinder, a synchronizing pulse will be applied to the oscilloscope 98 to initiate a sweep at the time the cylinder is at top dead center position.

Often times in the course of analyzing an engine, it becomes desirable to relate the occurrence of an event to the piston position as indicated by the number of degrees past top dead center position that the particular phenomena occurs. In accordance with the principles of the present invention, there is provided a means for indicating on the scope trace a particular point. This is accomplished by connecting the marker output 80 to the vertical input of the scope if it is desired that the indication appear as a pulse on the scope trace or by applying the marker output 80 to the Z axis of the scope to either blank or intensify the scope trace at the particular point. Thus, if switches $S_4$, $S_5$ and $S_6$ are set to indicate the desired number of degrees past top dead center position of the cylinder under consideration, at such time as the count in the counter becomes equal to the setting of switches $S_4$, $S_5$ and $S_6$ an output pulse will be provided at terminal 80, producing the desired indication as described above. It will therefore be possible to ascertain with exactness what phenomena is occurring at a desired number of degrees past top dead center of the cylinder under consideration as displayed on the scope trace. It is to be noted in general that it is desirable to connect the terminal 80 to the vertical input as a pulse will normally be much more distinguishable than a point of intensification or blanking of the trace. However, the mixer 101, which may be of many conventional types, is necessary if both the signals from terminal 80 and transducer 100 are to be applied to the vertical input of the oscilloscope.

It will be appreciated that the transducer 100 whose output is connected to the vertical input of the scope can be of many differing types depending upon the particular test of interest. Thus, the transducer 100 could be either a pressure transducer in which case the $p$–$t$ curve of the cylinder would be displayed or a vibration transducer, or a transducer for displaying the ignition characteristics of the engine.

A variable frequency oscillator may be used as transducer 50 in those instances in which it is not practical to connect a code disk or other transducer to be driven by the engine crank shaft. However, the frequency of the oscillator must be adjusted to provide the desired number of pulses each cycle of the engine. Adjustment of the oscillator frequency can be obtained by connecting line 22 to mixer 101 through line 180. Switches $S_1$, $S_2$ and $S_3$ are set to 0–0–0 and switches 16 and 90 are set to close to contacts 20 and 92 respectively. At the beginning of the scope trace and at the end of each engine cycle, pips or markers 182 and 184 will appear on the trace 186 as the result of the signals present on line 22. Similarly, a pip or marker 188 will appear on the trace 186 as the result of the output from terminal 80. If switches $S_4$, $S_5$ and $S_6$ are set to 360 and the frequency of the oscillator adjusted such that pip 184 coincides with pip 188, the oscillator will be operating at the desired frequency.

Although the invention has been described with reference to a particular preferred embodiment thereof, many changes and modifications will become apparent to those skilled in the art in view of the foregoing description which is intended to be illustrative and not limiting of the invention defined in the appended claims.

What I claim is:

1. An engine analyzer system for a multi-cylinder engine having a crankshaft comprising:
   (a) counter means;

(b) means for setting in said counter means each cycle of the engine being analyzed a count which is a function of the engine crankshaft position when a cylinder under consideration is at a selected position relative to a predetermined crankshaft position when said crankshaft is at said predetermined crankshaft position;

(c) means responsive to the count in said counter means for providing an output signal indicating that the cylinder under consideration is at the selected position; and (d) means for advancing the count in said counter means a predetermined amount each cycle of the engine whereby output signals are produced in the synchronism with the cycles of the engine.

2. An engine analyzer system as defined in claim 1 further including an oscilloscope and means for applying said output pulses to a synchronizing input of said oscilloscope whereby a trace on said oscilloscope is initiated in response to each such output pulse.

3. An engine analyzer system as defined in claim 1 wherein said means for setting a count in said counter each cycle of the engine being analyzed comprises a first transducer for producing an output signal each cycle of the engine being tested.

4. An engine analyzer system as defined in claim 1 wherein said counter means is capable of storing a count at least equal to the number of signals applied to advance the count in said counter means each cycle of said engine.

5. An engine analyzer system as defined in claim 1 wherein said counter means is an electronic counter responsive to electrical pulses applied thereto and wherein said last named means comprises means for generating and applying to said counter means a predetermined number of electrical pulses each cycle of said engine.

6. An engine analyzer system as defined in claim 5 wherein said last named means comprises a disk having a plurality of light transmitting passageways formed therein, a source of light, and means responsive to change in the intensity of light impinging thereon for producing an electrical pulse.

7. An engine analyzer system comprising:
(a) counter means;
(b) a first transducer for producing an output signal each cycle of the engine being analyzed;
(c) switch means connected between said first transducer and said counter means for applying said output signal to said counter means in accordance with the setting of said switching means to thereby set in said counter a count indicated by said switching means;
(d) means responsive to the count of said counter means for producing an output signal; and
(e) means for advancing the count in said counter means a predetermined amount each cycle of the engine whereby output signals are produced in synchronism with the cycles of the engine.

8. An engine analyzer system as defined in claim 7 further including means connected between said transducer and said switching means for applying to said switching means signals which are an integral portion of the number of output signals produced by said transducer.

9. An engine analyzer system as defined in claim 8 wherein said transducer is a magnetic pickup responsive to rotation of the crankshaft of said engine being analyzed.

10. An engine analyzer system as defined in claim 9 wherein said transducer produces an output pulse each revolution of said crankshaft.

11. An engine analyzer system comprising:
(a) an electronic counter responsive to electrical pulses applied thereto;
(b) means for generating and applying to said electronic counter 360 pulses each revolution of a crankshaft of said engine;
(c) means for setting a count in said counter each cycle of the engine being analyzed; and
(d) means responsive to the count in said counter for producing an output signal in synchronism with the cycles of the engine.

12. An engine analyzer system comprising:
(a) an electronic counter responsive to electrical pulses applied thereof;
(b) means for setting a count in said electronic counter each cycle of the engine being analyzed;
(c) means responsive to the count in said electronic counter for producing an output signal; and
(d) means for generating electrical pulses at a settable pulse repetition rate each cycle of the engine to advance the count in the electronic counter a predetermined amount each cycle of the engine whereby output signals are produced in synchronism with the cycles of the engine.

13. An engine analyzer system comprising:
(a) counter means;
(b) means for setting a count in said counter means each cycle of the engine being analyzed;
(c) means responsive to the count in said counter means for providing an output signal;
(d) means for advancing the count in said counter means a predetermined amount each cycle of the engine whereby output signals are produced in synchronism with the cycles of the engine;
(e) switch means settable to desired counts and means interconnected with said switching means and said counter means for producing an additional output signal responsive to coincidence between the count set in said switching means and the count stored in said counter means.

14. An engine analyzer system as defined in claim 13 wherein said means interconnected includes diode gate means.

15. An engine analyzer system comprising:
(a) counter means;
(b) means for setting a count in said counter means each cycle of the engine being analyzed;
(c) diode gate means responsive to the count in said counter means for producing an output signal; and
(d) means for advancing the count in said counter means a predetermined amount each cycle of the engine whereby output signals are produced in synchronism with the cycles of the engine.

16. An engine analyzer system as defined in claim 15 further including means responsive to a signal from said diode gate means for producing a pulse of width less than the period of the rate at which the count in the counter advances and means for applying said pulse to set said counter to a count of zero.

17. An engine analyzer system comprising:
(a) decade counter means;
(b) means for setting a count in said decade counter means each cycle of the engine being analyzed;
(c) means responsive to the count in said decade counter means for producing an output signal; and
(d) means for advancing the count in said decade counter means a predetermined amount each cycle of the engine whereby output signals are produced in synchronism with the cycles of the engine.

18. An engine analyzer system comprising:
(a) a first transducer for providing a first output signal each cycle of an engine to be tested;
(b) a second transducer for providing a series of output signals each cycle of said engine;
(c) a counter means;
(d) means responsive to the occurrence of said first output signal from said first transducer to set in said counter means each cycle of the engine being analyzed a count which is a function of the engine crankshaft position when a cylinder under consideration is at a selected position relative to the crankshaft position when a master cylinder is at a predetermined position;
(e) means for applying said series of output signals to advance the count in said counter means;
(f) an oscilloscope; and
(g) means responsive to the count stored in said counter means for applying a synchronizing pulse to said oscilloscope on which a characteristic curve of said engine is to be displayed.

19. In a method of analyzing an engine by displaying desired characteristics on a recorder, the improvement comprising:
(a) setting a counter to a count related to the angular relationship of cylinder under test to a master cylinder when the master cylinder is at a selected position;
(b) advancing the count in said counter at a settable rate each cycle of said engine; and
(c) applying a synchronizing signal to the input of a recorder only responsive to the count in said counter attaining a predetermined level.

20. A method as defined in claim 19 wherein the settable rate is such that the count stored in said counter attains the predetermined level once each cycle of the engine and said predetermined level is equal to the number of degrees of rotation of the engine crankshaft each cycle.

21. A method as defined in claim 20 further including the step of resetting the counter to 0 responsive to the responsive to the count in said counter becoming equal to a predetermined number of degrees past the top dead center position of the cylinder under test.

22. A method as defined in claim 19 further including the step of resetting the counter to 0 responsive to the count in said counter attaining the predetermined level.

References Cited

UNITED STATES PATENTS

| | | | |
|---|---|---|---|
| 3,010,313 | 11/1961 | Weller | 73—117.2 |
| 3,175,152 | 3/1965 | Shafer | 73—189 |
| 3,243,997 | 4/1966 | Traver | 73—117.2 |
| 3,323,067 | 5/1967 | Eckl | 328—45 X |

RICHARD C. QUEISSER, Primary Examiner

JERRY W. MYRACLE, Assistant Examiner

U.S. Cl. X.R.

235—103